(12) United States Patent
Nguyen et al.

(10) Patent No.: US 6,516,845 B2
(45) Date of Patent: Feb. 11, 2003

(54) SUPPORT DEVICE WITHIN A TIRE CAVITY TO PROVIDE RUNFLAT CAPABILITY

(75) Inventors: Gia Van Nguyen, Rossignol (BE); Jean Luc Dheur, Arlon (BE)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/813,695

(22) Filed: Mar. 21, 2001

(65) Prior Publication Data

US 2001/0032692 A1 Oct. 25, 2001

Related U.S. Application Data

(63) Continuation-in-part of application No. 09/496,507, filed on Feb. 2, 2000, now abandoned.

(51) Int. Cl.[7] .............................. B60B 21/02; B60C 5/00
(52) U.S. Cl. .................... 152/158; 152/155; 152/381.5
(58) Field of Search ............................. 152/381.5, 158, 152/157, 340.1, 312, 331.1, 333.1, 338.1, 339, 152, 155

(56) References Cited

U.S. PATENT DOCUMENTS

| 649,053 A | * | 5/1900 | Henderson .................. 152/158 |
| 1,900,568 A | * | 3/1933 | Krug .......................... 152/158 |
| 2,045,341 A | * | 6/1936 | Bourdon ..................... 152/158 |
| 4,372,365 A | * | 2/1983 | Osada et al. ................. 152/158 |
| 4,424,842 A | * | 1/1984 | Trebaol ....................... 152/158 |
| 4,572,260 A | * | 2/1986 | Ordu .......................... 152/520 |
| 6,360,800 B1 | * | 3/2002 | Howald ....................... 152/156 |

* cited by examiner

*Primary Examiner*—S. Joseph Morano
*Assistant Examiner*—Long Bao Nguyen
(74) *Attorney, Agent, or Firm*—Howard M. Cohn (57) ABSTRACT

A tire assembly (200) having runflat capability comprises a tire (202) mounted to a rim (203) to provide a tire cavity (204) defined by a carcass circumferential inner surface (246), two sidewall inner surfaces (248A,248B) and the rim. The tire assembly (200) is characterized by having a platform (206) disposed circumferentially around the rim within the tire cavity and one or more hoops (208A–208C) disposed within the tire cavity (204) between the platform (206) and the carcass circumferential inner surface (246) so that under normal inflation the one or more hoops do not contact either the carcass circumferential inner surface (246) or the sidewall inner surfaces (248A,248B), but below a first runflat inflation pressure, the one or more hoops (208A–208C) contact and support the carcass circumferential inner surface (246).

12 Claims, 12 Drawing Sheets

SUPPORT DEVICE WITHIN A TIRE CAVITY TO PROVIDE RUNFLAT CAPABILITY

RELATED APPLICATIONS

This application is a continuation-in-part application of U.S. patent application Ser. No. 09/496,507, now abandoned having a filing date of Feb. 2, 2000 and a common assignee with the present invention.

TECHNICAL FIELD

The present invention relates to a pneumatic vehicle tire, and more specifically to a pneumatic vehicle tire afforded runflat capability by means of a support structure within the tire cavity.

BACKGROUND OF THE INVENTION

It is desirable for a tire tread to bear against the ground uniformly along its width, so that the load on the tire is evenly distributed. When a tire is under-inflated, and especially deflated, the portion of the tire's sidewalls near the ground bulge outward. If the tire is stiff along the sidewalls, tread and shoulders, the sidewall bulge causes the lateral-center of the footprint (portion of the tread contacting the ground) to lift off the ground, forming an upward bow in the lateral cross-section of the footprint. The stiff tire acts like a lever, and the shoulder against the ground acts as its fulcrum. This "lateral tread-lift" is aggravated by sidewalls and tread that are relatively stiff or thick, and by a small ply line radius (i.e. sharp bend) in the shoulder.

Similarly, when the tire is under-inflated, and especially deflated, the circumferential cross-section of the tread is sharply bent at the front and rear edges of the footprint, causing the circumferential-center of the footprint to lift off the ground, forming an upward bow in the circumferential cross-section of the footprint. The stiff tread acts like a lever in 2 places, and the front and rear edges of the footprint shoulder against the ground act as two fulcrums. This "circumferential tread-lift" is aggravated by a tread that is relatively stiff or thick.

Tread-lift, whether lateral or circumferential, causes the center portion of the tread to bear little or none of the tire's load, which produces several problems. It degrades vehicle handling characteristics, especially in cornering. It increases tread wear near the shoulders and increases material fatigue under the tread due to the cycling of the bending stresses, and hence shortens tire life. Tread-lift is a problem whether the tread center actually lifts off the ground or merely loses pressure against the ground.

When a tire is under-inflated, its tread loses lateral stability and is prone to move (sway) laterally at the footprint. This yields a swerving ride and poor handling.

Pneumatic tires designed for continued operation under deflated or under-inflated conditions are referred to as "runflat" tires, as they are capable of being driven in the flat condition, without the sidewalls collapsing or buckle while driving to where the tire can be changed. In general, "runflat" means that the tire structure alone has sufficient strength to support the vehicle load when the tire is operated in the deflated state.

Generally, runflat tires incorporate, within the sidewalls, reinforcements called "wedge inserts" or "sidewall inserts", which are fillers generally having a cross-sectional crescent shape, that are sufficiently rigid to keep the sidewalls from collapsing or buckling. Such sidewalls are thicker and stiffer than in non-runflat tires, so that the tire's load can be carried by a deflated tire without compromising vehicle handling until the tire can be repaired or replaced. Such inserts are located in the inner surface of the sidewall portion of the carcass, which is the region in the tire experiencing the greatest flex under load. In such runflat designs, the entire sidewall has an approximately uniform thickness corresponding to the thickness of the bead region, so as to provide runflat supporting rigidity.

Runflat tires using sidewall inserts suffer from several problems: In runflat mode (i.e. while running under-inflated), due to the large mass of rubber required to reinforce the sidewalls, heat and material fatigue from cyclical flexure of the sidewalls is a major cause of tire failure. In runflat mode, the thicker, stiffer sidewalls of runflat tires renders them more prone to lateral tread-lift, with all the aforementioned problems associated with tread-lift. Also, runflat tires suffer from lateral tread-sway when under-inflated, as do all tires.

Even during normal inflated operation, the hysteresis of the material of the thickened runflat tire's sidewalls contributes to its rolling resistance and fatigue, which reduces the vehicle's fuel efficiency and tire life. Also, during normal inflated operation, the increased sidewall stiffness in runflat tires produces a rougher (less soft, less comfortable) ride and worse handling characteristics. Also, the additional weight of a sidewall insert renders it difficult to handle and mount. Moreover, the additional sidewall inserts add cost to the manufacturing process.

U.S. Pat. No. 5,368,082, to Oare et al, having a common assignee with the present invention, disclosed the first commercially accepted runflat pneumatic radial ply tire, employing sidewall inserts to improve stiffness. This runflat tire required about six additional pounds of weight per tire to support an 800 lb. load when deflated. This weight penalty was even greater for heavier vehicles with high aspect ratios, such as luxury sedans. U.S. Pat. Nos. 5,427,166 and 5,511,599, both to Willard, incorporate an additional third ply and third insert in each sidewall to further increase runflat performance. The resulting improvement in runflat ability comes at the price of further increased weight, flexural heat, material fatigue, tread-lift and manufacturing cost, and poorer handling and rougher ride.

Another method to achieve runflat ability is by incorporating a support structure within the tire cavity which does not contact the tread during normal inflated operation, but supports the tread and keeps it from collapsing when the tire is deflated. Advantages of using these support structures over using sidewall inserts is that they do not degrade tire performance during normal inflated operation, they can be implemented with standard (non-runflat) tires, do not increase tire manufacturing cost, and can prevent tread-lift. Some examples of these support structures are as follows:

U.S. Pat. No. 4,257,467 discloses, in a second embodiment shown in FIG. 3, a toroidal support element including a torus-like body of circular cross section whose "resilience can be increased by recesses or bore 30 running substantially parallel to the axis of the body 29". This does not prevent lateral tread-sway.

U.S. Pat. No. 5,271,444 discloses a rubber solid inner tire 30 fixedly mounted to the inner surface of the tread. This does not prevent lateral tread-sway and adds significant weight.

U.S. Pat. Nos. 4,254,810 and 3,993,114 disclose designs, employing an inner tube disposed within the tire cavity, that indirectly supports the tread during runflat mode but not during normal inflated operation. These designs do not stiffly support the tread nor prevent tread-lift or lateral tread-sway during runflat mode. They require two valves or equivalent.

U.S. Pat. Nos. 3,857,427; 4,346,747; 4,157,106 and 4,193,436 disclose various other annular support members surrounding the rim, that support the tread during runflat mode, but are spaced from the tread during normal inflated operation. These, too, do not prevent lateral tread-sway and add significant weight.

SUMMARY OF THE INVENTION

It is an aspect of the present invention to provide a tire as defined in one or more of the appended claims and, as such, having the capability of being constructed to accomplish one or more of the following subsidiary aspects.

It is an aspect of the present invention to provide runflat ability to a non-runflat tire, with a support structure that is relatively light, reduces tread-lift and lateral tread-sway, and does not degrade handling in normal-inflated operation.

Additionally, it is an aspect of the present invention to increase the runflat performance of a runflat tire, with a support structure that is relatively light, reduces tread-lift and lateral tread-sway, and does not degrade handling in normal-inflated operation.

Additionally, it is an aspect of the present invention to maintain a tight seal between the bead and rim during under-inflated operation.

A tire assembly having runflat capability comprises a tire mounted to a rim to provide a tire cavity that is defined by a carcass circumferential inner surface, two sidewall inner surfaces and the rim. The tire assembly is characterized by a circumferential platform disposed within the tire cavity, around the rim, having a circumferential radially-outer surface ("platform surface") and two platform sides. The tire assembly also has one or more hollow deformable hoops within the tire cavity, disposed around the platform surface, between the platform and the carcass circumferential inner surface, so that under normal inflation the one or more hoops do not contact either the carcass circumferential inner surface or the sidewall inner surfaces, but below a first runflat inflation pressure, the one or more hoops contact and support the carcass circumferential inner surface. Below a second runflat inflation pressure, lower than the first runflat inflation pressure, the hoops bulge laterally and press against the sidewall inner surfaces to support the sidewalls and prevent them from buckling.

The one or more hoops are constructed of a material selected from the group including plastic, rubber based material, and spring metal.

The one or more hoops have reinforced walls that are reinforced by means including corrugated walls, cord reinforcements, and/or fiber reinforcements. The number of hoops is three or more and preferably an odd number.

The hoops have cross-sectional shapes chosen from round or elliptical, wherein the major axis of each elliptical hoop is preferably aligned radially (but may be aligned axially or in any direction depending on the specific tire design), and where the major axes of all elliptical hoops and the diameters of all round hoops are preferably equal. The cross-sectional elliptical shapes of all the hoops can all be the same, or different but symmetric around an equatorial plane (EP) of the tire assembly.

In one embodiment, the platform surface is rigid and meridionally flat.

In another embodiment, the platform surface is flexible and bowed, and below the second runflat inflation pressure, the platform surface is straightened, and presses against the tire's inner bead surfaces to lock the tire's beads more tightly in place.

One or more of the hoops can be slidably affixed to the platform by means such as having each of the one or more of the hoops having at least one "T"-shaped key in the hoop's inner periphery slidably attached into a corresponding inverted "T"-shaped cavity within the platform.

Also the hoops can be affixed together at their mutual peripheries of contact.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in some of the drawings may be illustrated not-to-scale for illustrative clarity.

In the drawings, the hundredth's place of each reference number usually matches the figure number, and similar elements are usually referred to by similar reference numbers. For example, element 199 in FIG. 1, element 299 in FIG. 2, and element 399 in FIG. 3 might indicate corresponding or substantially similar elements.

The same element appearing in different figures is usually given the same reference number in all figures.

In a single drawing, similar elements may be assigned the same number. For example, both beads of the same tire may be assigned the same numeral.

For illustrative clarity, the cross-sectional views presented herein may be in the form "near-sighted" cross-sectional views, omitting certain background lines that would otherwise be visible in a true cross-sectional view.

The structure, operation, and advantages of the invention will become further apparent upon consideration of the following description taken in conjunction with the accompanying drawings, wherein.

DEFINITIONS

"Axial" and "axially" mean parallel to the tire's axis of rotation.

"Bead" means an annular tensile member that is associated with holding the tire to the rim. The beads are wrapped by ply cords and shaped, with or without other reinforcement elements such as flippers, chippers, apexes or fillers, toe guards and chafers.

"Belt structure" means at least two annular layers or plies of parallel cords, woven or unwoven, underlying the tread, unanchored to the bead, and having both left and right cord angles in the range from 18 to 30 degrees relative to the equatorial plane of the tire.

"Carcass" means the tire structure apart from the belt structure and the tread. Its main components are the sidewalls, plies and bead areas.

"Equatorial plane" means the plane perpendicular to the tire's axis of rotation and passing through the center of its tread; or the plane containing the circumferential centerline of the tread.

"Footprint" means the contact area of the tire tread with a flat surface at a given speed.

"Wedge Insert" means the cross-sectionally crescent- or wedge-shaped reinforcement typically used to reinforce the sidewalls of runflat-type tires.

"Meridional" herein refers to a plane that includes the tire axis, or a tire profile cut along that plane.

"Normal inflated operation" or "normal inflated mode" means tire use under the inflation pressure and load assigned by the appropriate standards organization for the service condition for the tire.

"Ply" means a cord-reinforced layer of rubber-coated radially deployed or otherwise parallel cords.

"Radial" and "radially" mean perpendicular to the tire's axis of rotation.

"Radial ply tire" means a belted or circumferentially-restricted pneumatic tire in which at least one ply has cords which extend from bead to bead are laid at cord angles between 65 and 90 degrees with respect to the equatorial plane of the tire.

"Runflat mode" means tire use when the tire is being driven while deflated.

"Sidewall" means that portion of a tire between the tread and the bead.

DETAILED DESCRIPTION OF THE INVENTION

Prior Art

Figure 1A:
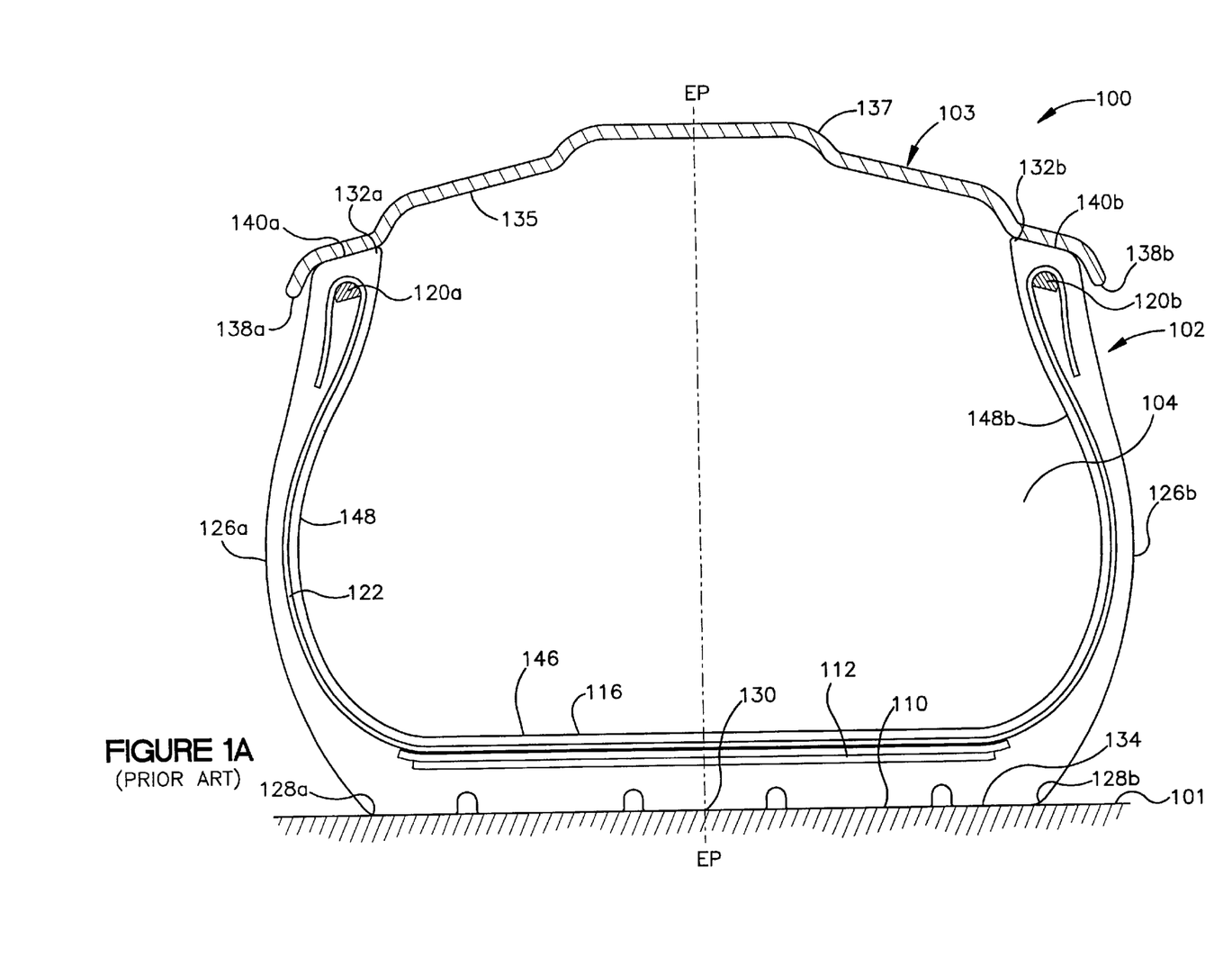
FIG. 1A shows a meridional cross-section of a prior art, conventional tire assembly, showing its profile as it would be when properly inflated and on a road surface.

FIG. 1A shows a meridional cross-section of a prior art tire assembly 100 for a vehicle, showing its profile as it would be when properly inflated and on a road surface 101. The tire assembly 100 comprises a pneumatic radial ply tire 102, a rim 103, and a tire cavity 104. The tire 100 has a tread 110, a belt structure ("belts") 112 comprising one or more belts, and a carcass 116. The carcass 116 has two inextensible annular beads 120A,120B, a radial ply 122, and two sidewalls 126A,126B. The area where each sidewall 126A, 126B meets the edge of the tread 110 is a shoulder 128A, 128B, respectively. The axially-center area of the tread 110 extending from shoulder 128A to shoulder 128B is a crown 130, which is generally the radially outermost area of the tire profile when not resting on the road surface 101. The radially innermost points of the tire profile are toes 132A,132B. The area of the tread 110 that contacts the road surface 101 is a footprint 134.

The rim 103 has a rim pan 135 (rim inner surface), rim outer surface 137, and two The rim flanges 138A,138B. The tire 102 has two heel seats 140A,140B which form a snug air-tight seal around the two rim flanges 138A,138B.

The tire cavity 104 is bounded by a carcass circumferential inner surface 146, two sidewall inner surfaces 148A, 148B, and the rim pan 135.

Figure 1B:
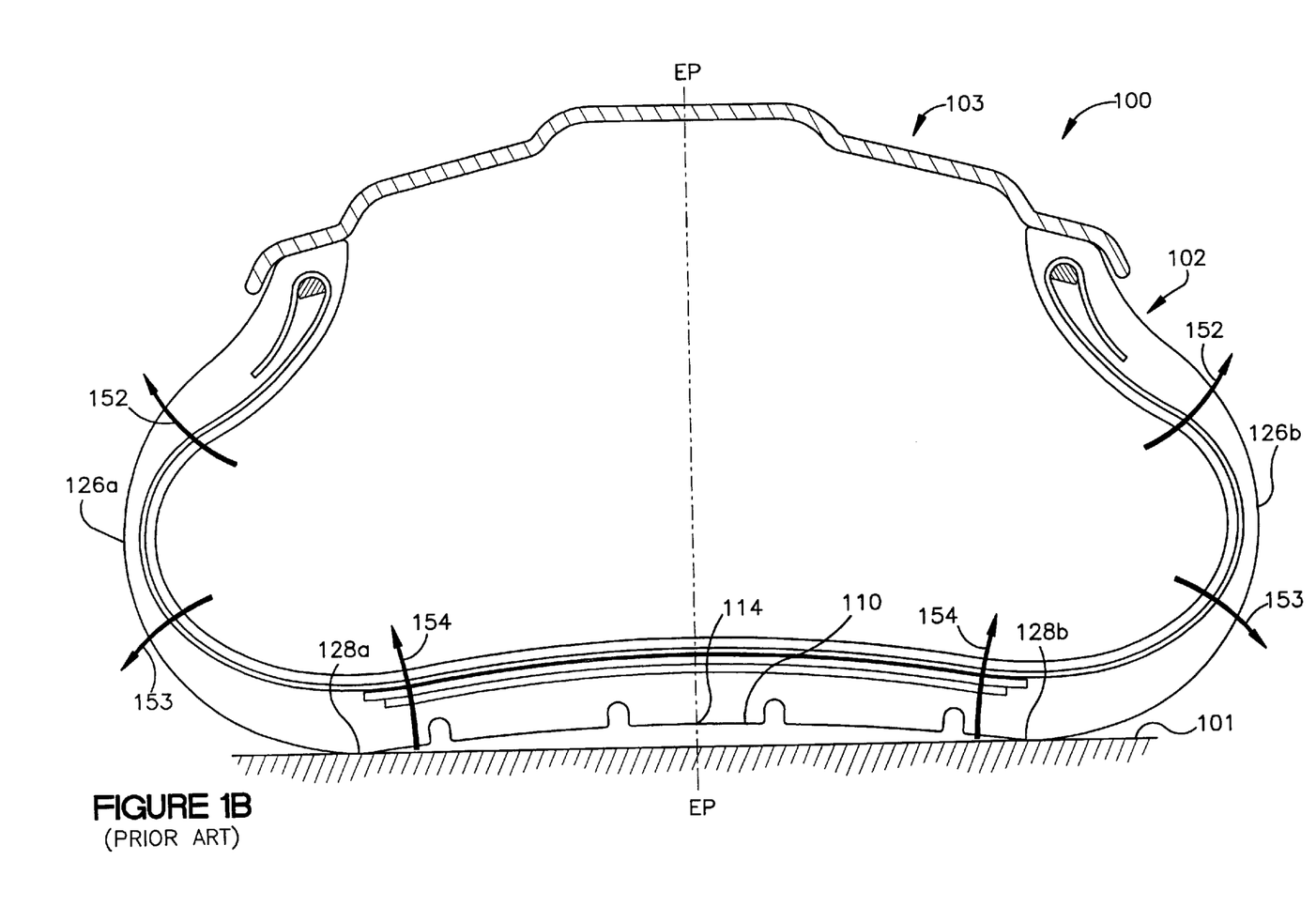
FIG. 1B shows a meridional cross-section of the prior art tire assembly of FIG. 1A, showing its profile as it would be when under-inflated and resting on a road surface.

FIG. 1B shows a meridional cross-section of the prior art tire assembly 100 of FIG. 1A, showing its profile as it would be when under-inflated and resting on a road surface 101. The reference numbers of FIG. 1B correspond with those in FIG. 1A. Under the vehicle's load, the sidewalls 126A,126B bulge outward, as illustrated by arrows 152,153. With the road surface 101 serving as a fulcrum against the shoulders 128A,128B, the displacements indicated by arrows 153 cause the tread 110 to lift at the crown 130, as indicated by arrows 154, resulting in "lateral tread-lift".

Figure 1C:
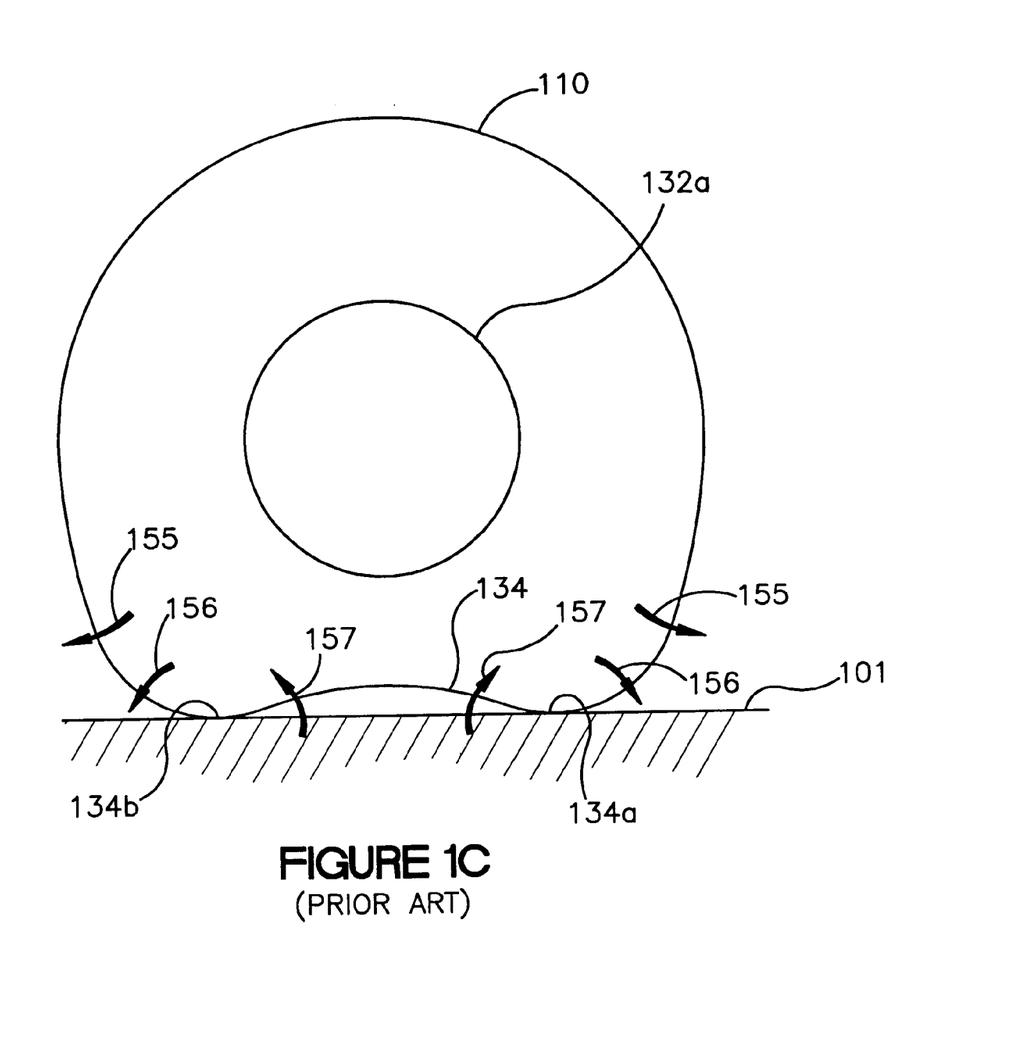
FIG. 1C is a diagrammatic side cross-section of the prior art tire assembly of FIG. 1A, cut along the equatorial plane, showing its profile as it would be when under-inflated and resting on a road surface.

FIG. 1C is a diagrammatic side cross-section of the prior art tire assembly 100 of FIG. 1A and 1B cut along the equatorial plane (EP of FIG. 1A), showing its profile as it would be when under-inflated and resting on a road surface 101. The reference numbers correspond with those in FIG. 1A. The footprint 134 has a front edge 134A and a rear edge 134B. Under the vehicle's load, and with the road surface 101 serving as a fulcrum against the edges 134A,134B of the footprint 134, the tread 110 on either side of the footprint 134 bulges outward, as illustrated by arrows 155,156, causing the tread 110 just within the edges 134A,134B of the footprint 134 to bend upward, as indicated by arrows 157, resulting in "circumferential tread-lift".

Tread-lift, whether lateral or circumferential, degrades vehicle handling, increases turning (steering) resistance, increases tread wear near the shoulders 128A,128B, increases material fatigue under the tread 110 due to the cycling of the bending stresses, and hence shortens tire life. Tread-lift is a problem whether the crown 130 actually lifts off the ground or merely loses pressure against the ground, thus distributing the tire's load unevenly across the tread. For tires in general, the problem of tread-lift is aggravated by increased sidewall stiffness (or thickness), increased tread stiffness (or thickness), deflation and lateral turning.

Figure 1D:
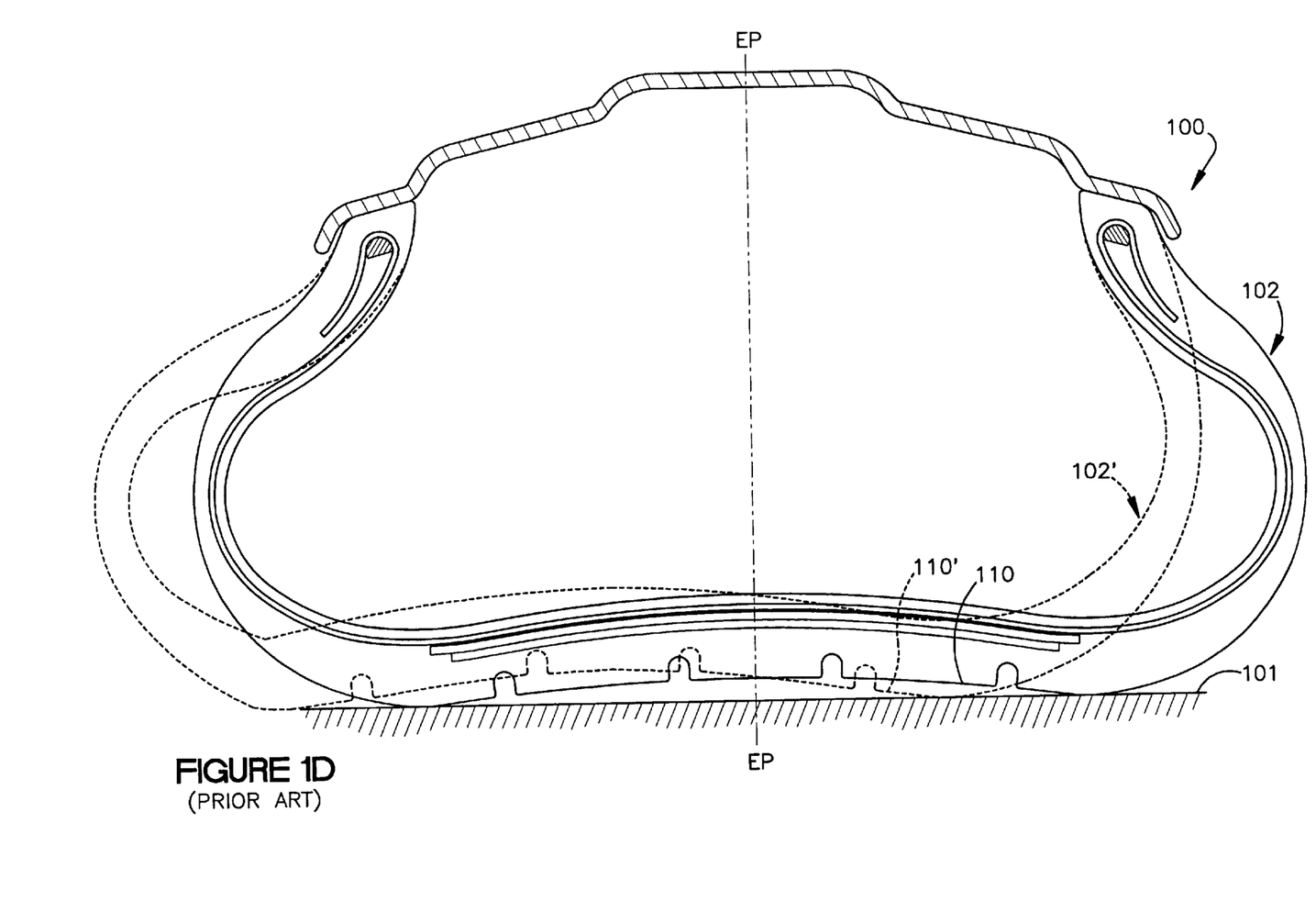
FIG. 1D shows a profile of the same meridional cross-section as in FIG. 1B of the prior art tire assembly as it would be when under-inflated and resting on a road surface.

FIG. 1D shows a profile of the same meridional cross-section as in FIG. 1B of the prior art tire assembly 100, as it would be when under-inflated and resting on a road surface 101. As illustrated in FIG. 1D in solid lines, the profile of the tire 102 is normally symmetric around the equatorial plane (EP). With insufficient air pressure to maintain taut tire walls, the tread 110 can move laterally, as indicated by tire 102' and tread 110' drawn in dashed lines. This "lateral tread-sway" yields a swerving ride and poor handling. If the tire and rim assembly have a runflat system based on a solid insert set on the rim inside the tire, the tread lift-off would be suppressed but not the lateral swerving effect on the tire.

Preferred Embodiment of the Present Invention

Figure 2A:
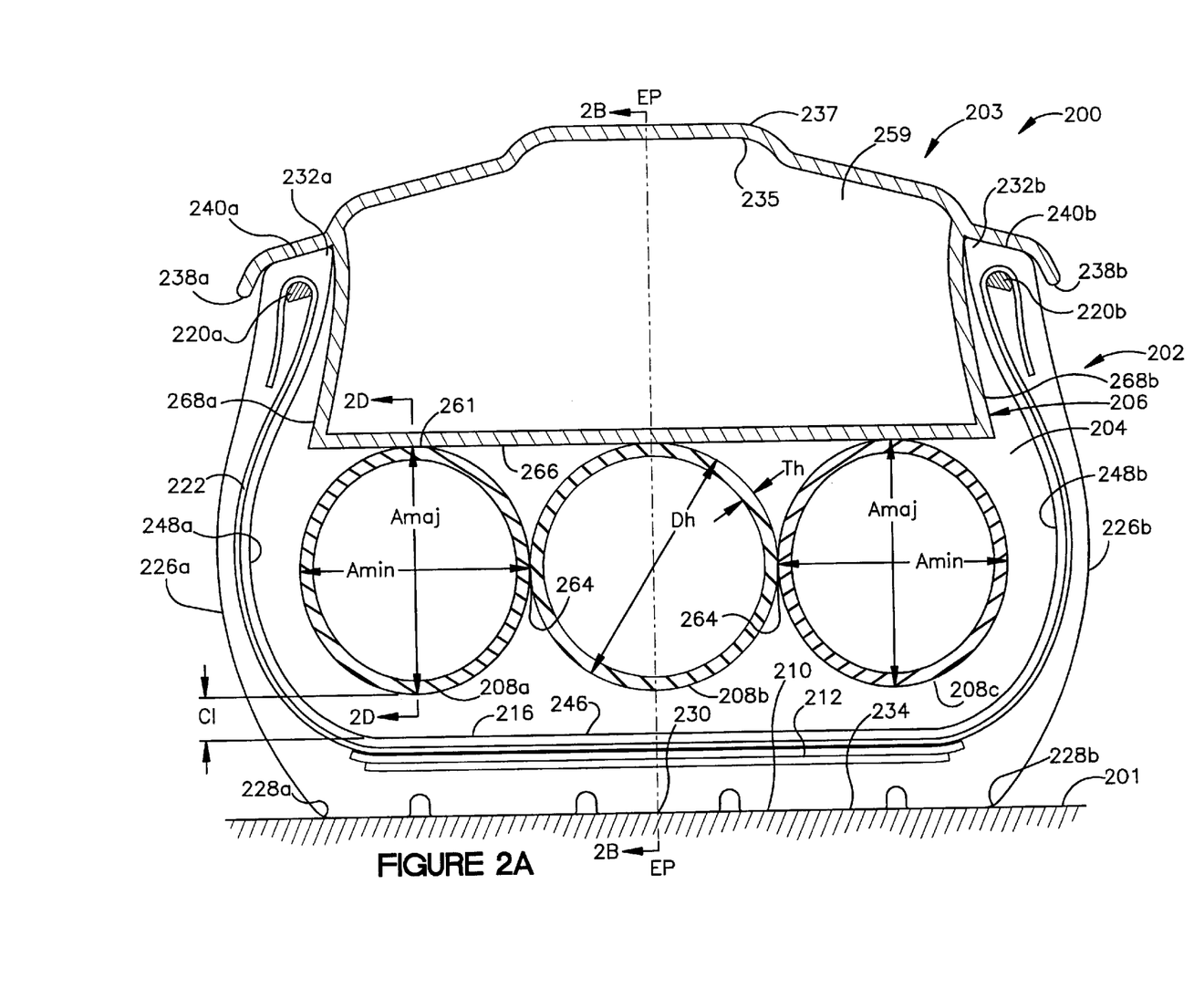
FIG. 2A shows a meridional cross-section of a tire assembly according to the present invention, showing its profile as it would be when properly inflated and resting on a road surface.
Figure 2B:
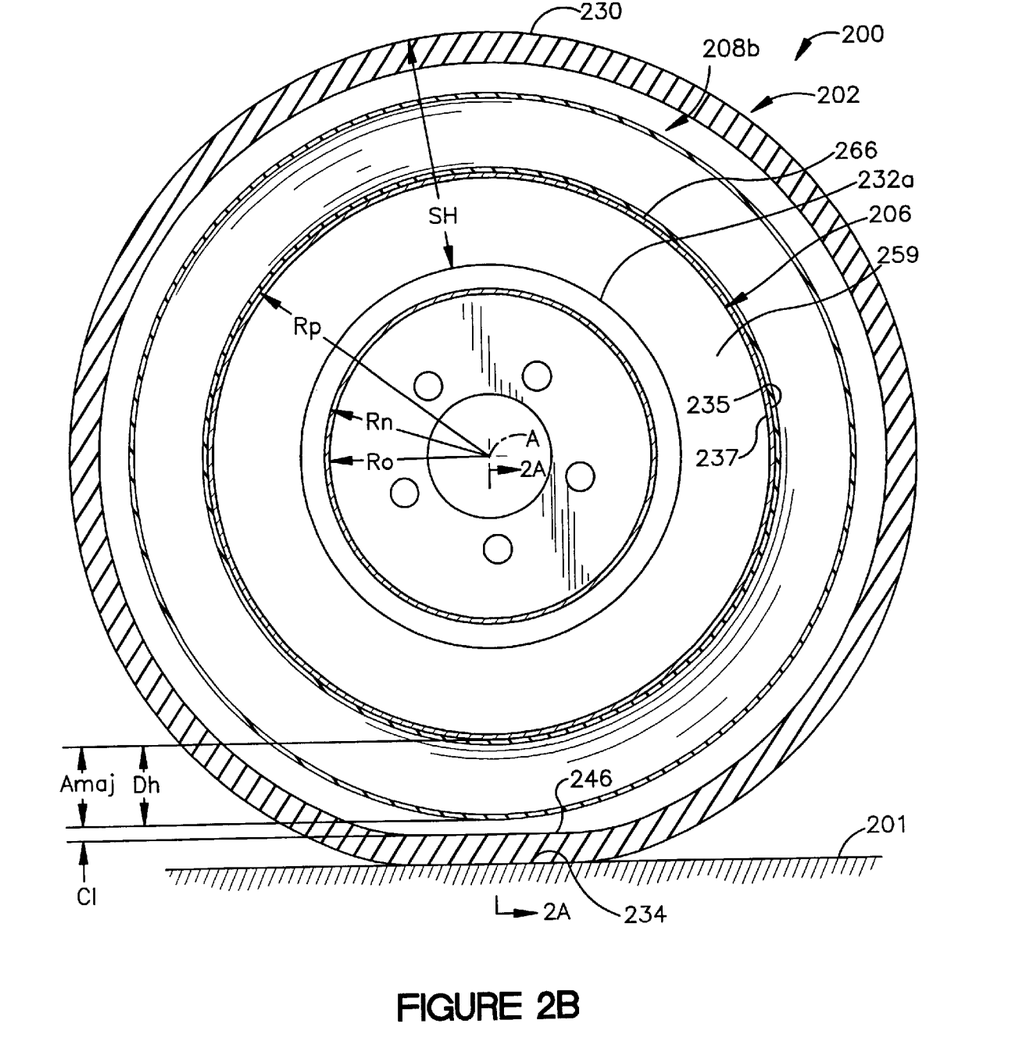
FIG. 2B shows a side cross-sectional view of the tire assembly of FIG. 2A as viewed along the 2B—2B line.

FIG. 2A shows a meridional cross-section of a tire assembly 200 for a vehicle, according to the present invention, showing its profile as it would be when properly inflated and resting on a road surface 201. FIG. 2B shows a side cross-sectional view of the tire assembly 200 as viewed along the 2B—2B line in FIG. 2A. Conversely, FIG. 2A shows a cutaway view of tire assembly 200 as viewed along the 2A—2A line in FIG. 2B.

The tire assembly 200 comprises a pneumatic radial ply tire 202, a rim 203, a tire cavity 204, a platform 206 disposed circumferentially around the rim, within the tire cavity, and three deformable toroidally-shaped hollow hoops 208A–208C disposed side-by-side around the platform 206, within the tire cavity.

The tire 202 has a tread 210, a belt structure ("belts") 212 comprising one or more belts, and a carcass 216. The carcass 216 has two inextensible annular beads 220A,220B, a radial ply 222, and two sidewalls 226A,226B. The area where each sidewall 226A,226B meets the edge of the tread 210 is a shoulder 228A,228B, respectively. The axially-center area of the tread 210 is a crown 230, which is the radially-outermost area of the tire 202 when not resting on the road surface 201. The radially innermost points of the tire profile are toes 232A,232B. The area of the tread 210 that contacts the road surface 201 is a footprint 234.

Figure 2C:
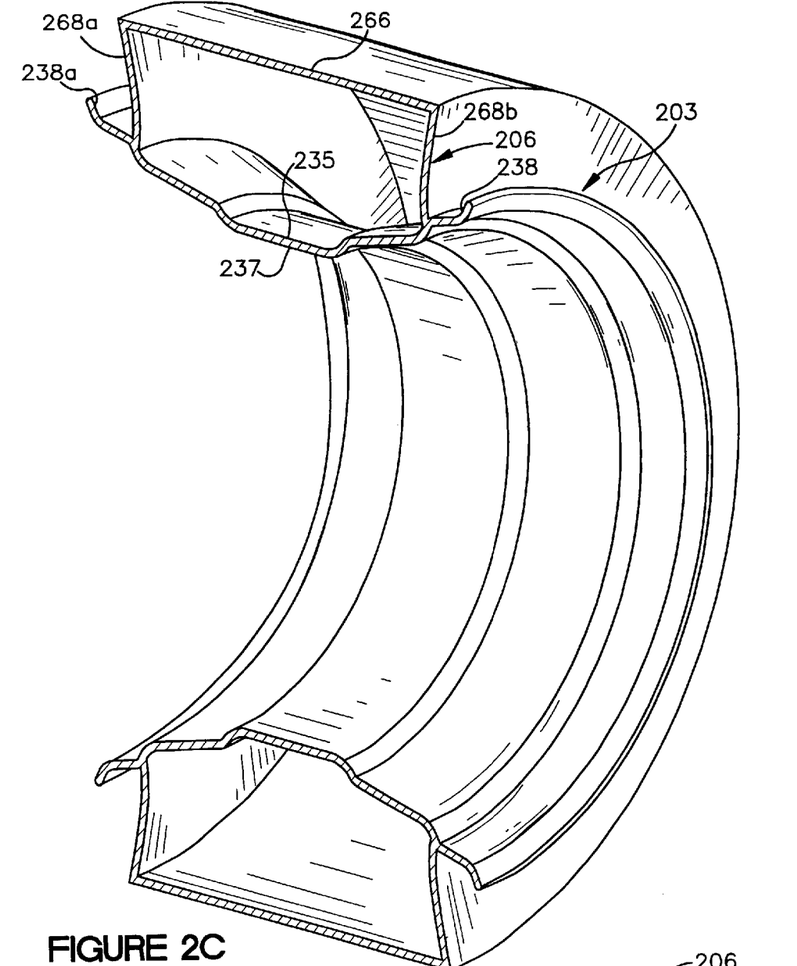
FIG. 2C shows a perspective view of half of the rim according to the present invention.

FIG. 2C shows a cutaway perspective view of the rim 203. As seen in FIGS. 2A–2C, the rim 203 has a rim pan 235, a rim outer surface 237, and two rim flanges 238A,238B. The tire 202 has two heel seats 240A,240B which form a snug air-tight seal around the two rim flanges 238A,238B. The rim 203 can be comprised of metal (such as steel or aluminum) or plastic (such as reinforced plastic), or composites thereof, or different materials disposed in different sections.

In this embodiment, as seen in FIGS. 2A–2C, the platform 206 is a rigid annular insert positioned circumferentially around the rim 203, within the tire cavity 204, having two side surfaces hereinafter called "platform sides" 268A,268B and a rigid meridionally-flat radially-outer circumferential surface hereinafter called "platform surface" 266 over which the hoops may 208A–208C slide axially. Preferably, the platform 206 is secured to the rim 203 by conventional means such as forming the rim 203 and the platform 206 as a single structure, or, alternately, the platform can be added later by means such as welding or bolting into place. The platform 206 can be comprised of metal or plastic (such as reinforced plastic), or composites thereof or different materials disposed in different sections.

Figure 4:
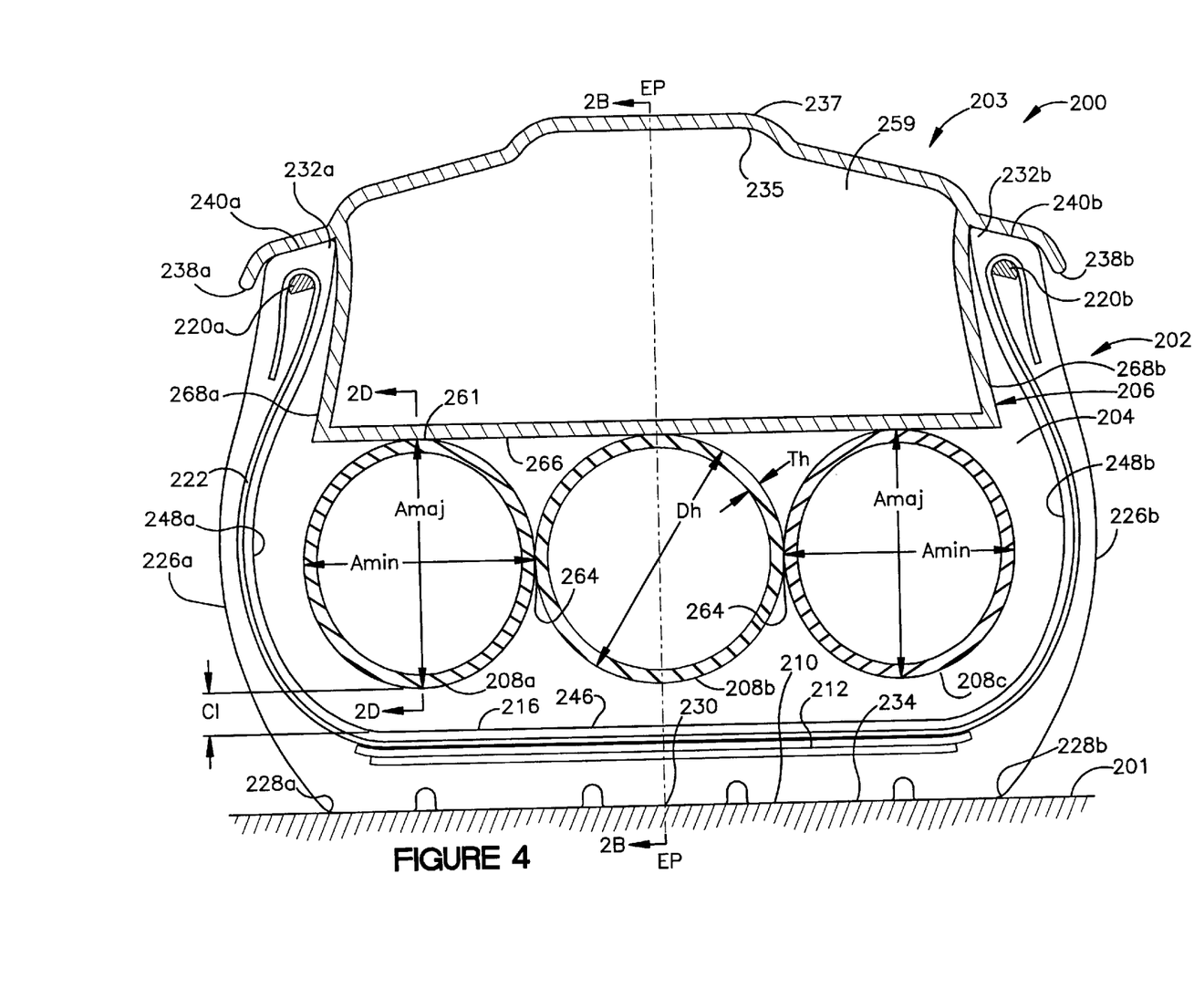
FIG. 4 shows a meridional cross-section of an embodiment of the tire assembly according to the present invention, showing the platform separated from the tire rim for mounting the tire onto the rim.
Figure 5:
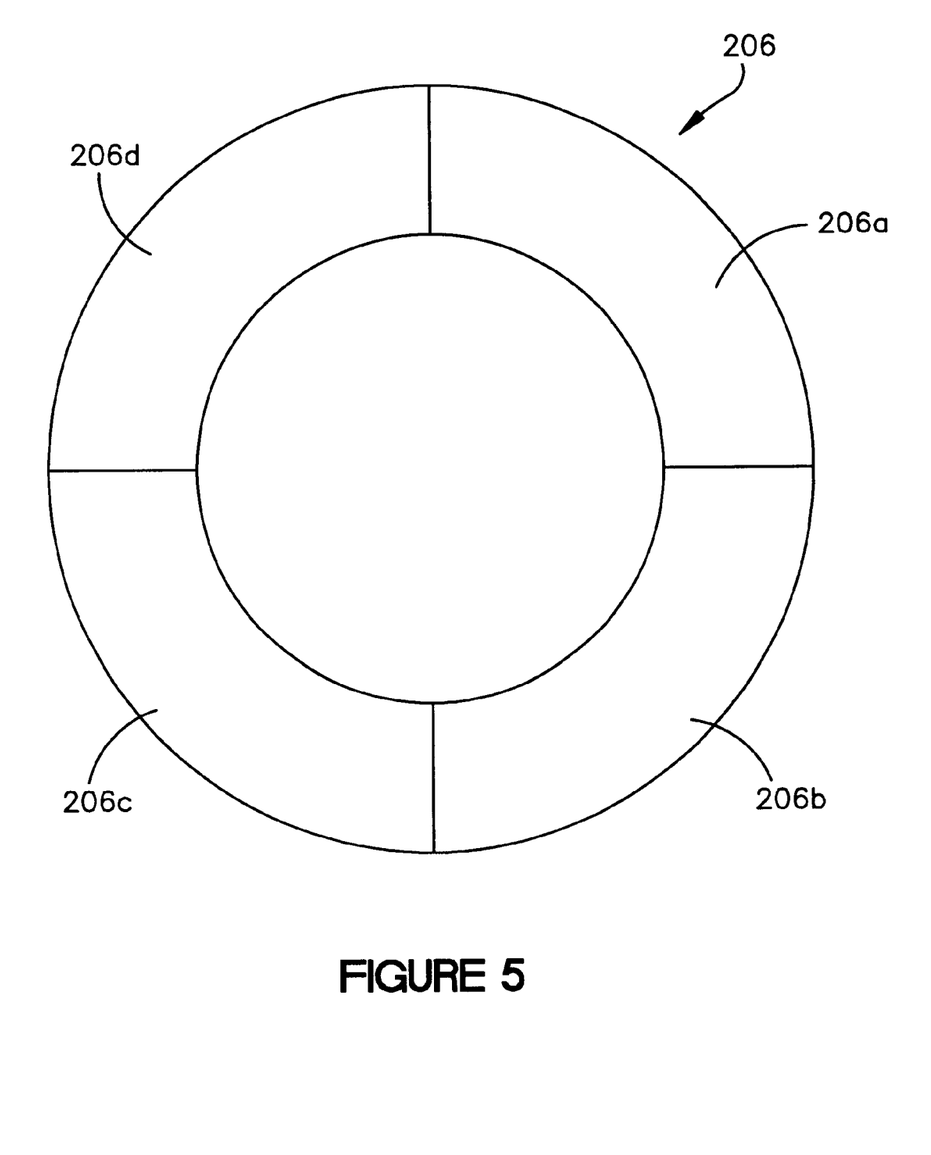
FIG. 5 shows the platform of FIG. 4 divided into four segments.

As seen in FIG. 4, the platform 206 is preferably a separate rigid annular insert positioned circumferentially around the rim 203. The platform 206, as shown in FIG. 5, is preferably divided into several, circumferential sub-segments 206a, 206b, 206c, and 206d (206a–206d) to allow for mounting the platform to the rim, as discussed herein below. While four segments 206a–206d are shown, it is within the terms of the invention to use more or less segments. Note that the segments would also be applicable to other embodiments such as platform 306. Each of the sub-segments 206a–206d is attached to each other by conventional means such as nuts and bolts, as shown for example in U.S. Pat. No. 5,593,520, which is incorporated in its entirety by reference herein. It is also within the scope of the invention to attach each of the sub-segments to each other (as in the U.S. Pat. No. 5,593,520) and/or to the rim by conventional means such as with nuts and bolts.

As seen in FIGS. 2A and 2B, the radius Rp (relative to the tire's axis of rotation A) of the platform surface 266 is chosen to bring the hoops 208A–208C close enough to a carcass circumferential inner surface 246 to support the carcass circumferential inner surface when the tire 202 is deflated, as will be explained later. The choice of radius Rn of the rim pan 235 and radius Ro of the rim outer surface 237 do not affect the principle of operation of this embodiment and can be any desired value. The large space 259 between the platform surface 266 and the rim outer surface 237 can be filled with either a light rigid material, reinforcing ribs, honeycomb, or the like.

As seen in FIG. 2A, the tire cavity 204 is mainly bounded by the carcass circumferential inner surface 246, two sidewall inner surfaces 248A,248B, and the rim pan 235.

The hoops 208A–208C are disposed side-by-side around the platform surface 266, within the tire cavity 204. Each hoop 208A–208C is an annular hollow tube with a circular (round) or elliptical cross-section. The center hoop 208B is disposed fixedly around the platform surface 266 at the equatorial plane (EP), such as by a tight fit, bolting or an adhesive. The two outer hoops 208A,208C are disposed slidably around the platform surface 266.

Although the present embodiment shows three hoops 208A–208C, it is within the scope of the invention to have any number of hoops (including only one). There is an advantage of using an odd number of hoops, so that the central hoop can be stationarily affixed to the axial-center of the platform surface 266, thus keeping all the hoops symmetrically spaced around the equatorial plane (EP), whereas an even number of hoops would not enable one hoop to be affixed. It has been found that, for a typical passenger vehicle, the number of hoops should be between one (1) and seven (7), and preferably between three (3) and five (5). Other considerations involved in choosing the optimum number of hoops are described hereinbelow.

The hoops 208A–208C can have a cross-sectional shape of either hollow round with an outer diameter Dh (FIG. 2A) or hollow elliptical with an outer major axis Amaj and an outer minor axis Amin. Within the scope of this invention, the elliptical major axis Amaj can be aligned at any angle. However, it is preferable that the elliptical major axis Amaj be aligned radially (i.e. perpendicular to the tire's axis of rotation) to yield a high "expansion factor", defined later, as long as the diameters Dh and the major axes Amaj of all hoops are equal. There can be some round and some elliptical hoops within a single tire, as long as the diameter Dh of all round hoops and the major axes Rmaj of all elliptical hoops are equal, as in the present embodiment in which the center hoop 208B is round and the outer hoops 208A,208C are elliptical with the major axes Amaj equaling the diameter Dh.

The hoops 208A–208C can have different elliptical shapes (i.e. different ratios of major axis Amaj to minor axis Amin), but, in this embodiment, preferably with all of their major axes Amaj being the same length and aligned radially. If the hoops 208A–208C are of different elliptical shapes, it is advantageous that their shapes be chosen to be symmetric around the equatorial plane (EP) (i.e. that the two hoops adjacent to the central hoop be the same elliptical shape, and the two hoops adjacent to those hoops be the same shape, etc.), as in the present embodiment in which the outer hoops 208A,208C share the same elliptical shape.

It has been found that, for a typical passenger vehicle, the cross-sectional diameter Dh for cross-sectionally round hoops and the cross-sectional major axis Amaj for cross-sectionally elliptical hoops can be between 30% and 70% of the section height SH (radial distance between the toes 232A,232B and the crown 230 where not resting on the surface 201, shown in FIG. 2B), and preferably between 40% and 65% of the section height. A smaller diameter Dh or major axis Amaj would degrade the runflat effectiveness of the hoops 208A–208C. A larger diameter Dh or major axis Amaj would cause the hoops 208A–208C to impact the carcass circumferential inner surface 246 during normal inflated operation.

The material and wall thickness Th of the hoops 208A–208C are chosen so that the hoops are light, deformable, have low hysteresis and high fatigue resistance. It has been found that, for a typical passenger vehicle, the material of the hoops 208A–208C can be plastic (thermoplastic or thermoset, preferably lightweight) or rubber based, with possibly corrugated walls, cord reinforcements, or fiber reinforcements or spring metal.

Figure 2D:
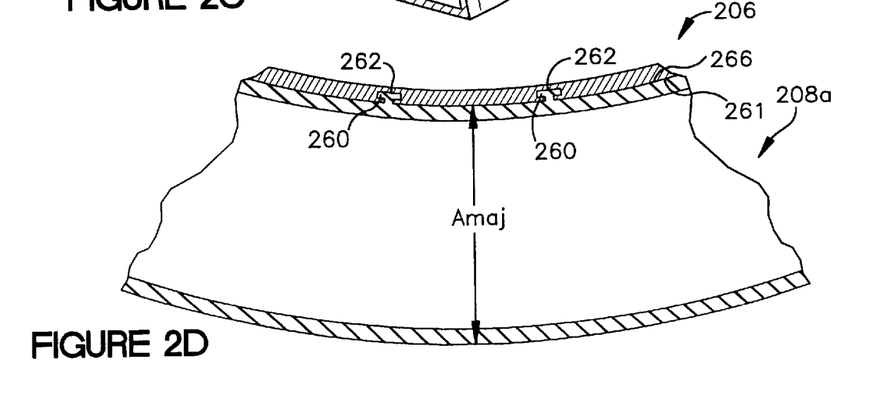
FIG. 2D shows a side cross-sectional view a portion of the tire assembly of FIG. 2A as viewed along the line 2D—2D.

In this embodiment, since the center hoop 208B is disposed fixedly around the platform surface 266, centrifugal force (when driving) will not expand it and separate it from the platform. However, to prevent centrifugal force from separating the slidable hoops 208A,208C from the platform surface 266, the hoops can be slidably affixed to the platform by an appropriate means, an example of which is shown in FIG. 2D (a side cross-sectional view of a portion of the tire assembly 200 of FIG. 2A as viewed along the 2D—2D line). In FIG. 2D, hoop 208A has "T"-shaped "keys" 260 spaced around its inner periphery 261 where it contacts the platform 206. Each "T"-shaped key 260 fits into a corresponding inverted "T"-shaped cavity 262 within the platform surface 266. This arrangement enables the hoop 208A to slide axially (i.e. parallel with the tire rotational axis) along the platform surface 266 without separating from it by centrifugal force.

As seen in FIG. 2A, the hoops 208A–208C are disposed side-by-side, in contact with each other at locations 264. To keep the hoops 208A–208C from separating from each other, they can be affixed together at their mutual periphery of contact 264 by any desired means, such as by an adhesive or by forming the hoops affixed to each other at peripheries 264 at the time they are molded (or extruded).

In normal inflated operation, as shown in FIG. 2A, the hoops 208A–208C do not contact any of the inner surfaces 246,248A,248B of the tire 202, and hence do not stiffen the tire nor degrade handling and driving comfort.

Figure 2E:
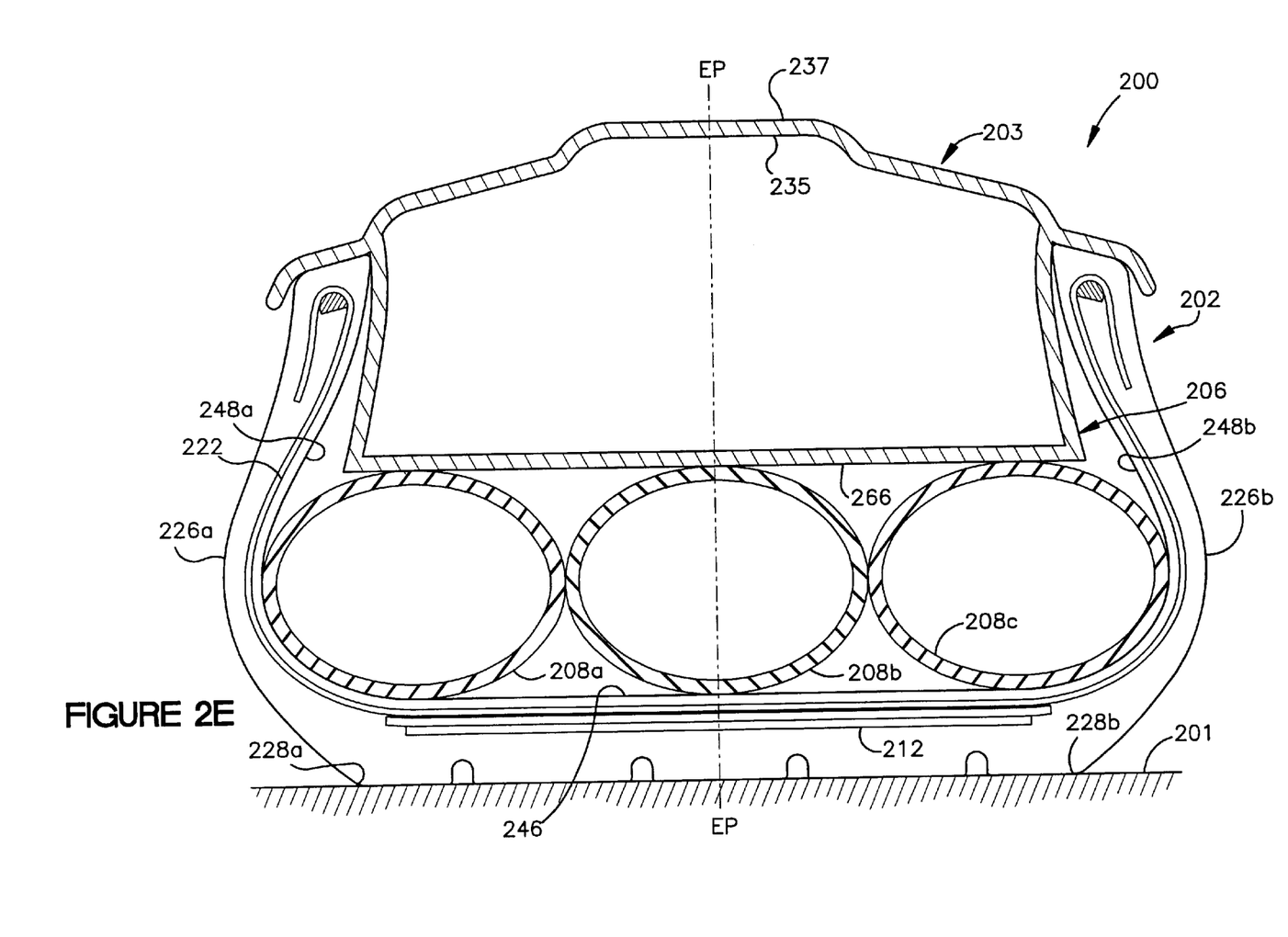
FIG. 2E shows a meridional cross-section of the tire assembly of FIG. 2A, showing its profile as it would be when under-inflated and resting on a road surface.

FIG. 2E shows a meridional cross-section of the tire assembly 200 of FIG. 2A according to the present invention, showing its profile as it would be in runflat mode that is, when deflated or under-inflated and resting on a road surface 201. In runflat mode, as tire pressure gradually drops below a certain threshold called "first runflat pressure threshold" (or "first runflat inflation pressure"), the carcass circumferential inner surface 246 starts to rest on, and become supported by, the hoops 208A–208C, thus supporting the tread 210 to prevent tread-lift. As tire pressure drops further, the hoops 208A–208C flatten out radially and bulge out sideways (axially), and the center hoop 208B pushes the outer hoops 208A,208C laterally outward. As tire pressure drops below another threshold called "second runflat pressure threshold" (or "second runflat inflation pressure"), the outer hoops 208A,208C press tightly against the sidewall inner surfaces 248A,248B, thus stretching the sidewalls 226A,226B and keeping them from swerving laterally.

The tire assembly 200 of the present embodiment alleviates the problems associated with the prior art tire assembly 100 of FIGS. 1A–1D. By supporting the tread 210, a non-runflat tire 202 is afforded runflat ability without increasing stiffness during normal inflated operation. For runflat tires (which already have runflat ability due to wedge inserts), runflat stiffness is enhanced (thereby reducing the required size, weight and cost of wedge inserts) without increasing stiffness during normal inflated operation For both runflat and non-runflat tires, tread-lift is reduced along with the aforementioned problems associated with tread-lift (flexural heating, fatigue, tread wear, poor handling, rolling resistance and steering resistance). Also, by supporting and keeping the sidewalls 226A,226B from buckling during runflat operation, lateral tread-sway is eliminated, thus improving stability when cornering and reducing sway. The hoops 208A–208C do not require inflation (as do some aforementioned prior art structural supports), which increases reliability and saves on maintenance and manufacturing cost. The hoops 208A–208C have a simple, light, rugged, low-cost construction relative to the prior art structural supports mentioned in the Background section.

Although the present embodiment has three hoops, it is within the scope of the invention to have more or less than three. In generally, the optimum number of hoops 208A–208C and the hoop dimensions are interrelated, and are based on the dimensions of the tire cavity 204, the desired deflection of the tread 210 before being supported by the hoops, and the desired deflection of the sidewalls 226A, 226B before being supported by the hoops.

Described more specifically, the optimum number of hoops is a compromise between two considerations; 1) the "first runflat pressure threshold" (which would dictate a relatively low number of hoops), and 2) the difference between the "second runflat pressure threshold" and "first runflat pressure threshold" (which would dictate a large number of hoops). The considerations are as follows. It is desirable that the "second runflat threshold" be as close as possible to the "first runflat threshold", because there is no reason for the runflat functionality of the hoops 208A–208C to take effect only partially. But the difference between the "second runflat threshold" and "first runflat threshold" is inversely related to the "expansion factor" (ratio of radial flattening to sideways expansion), which is itself proportional to the number of hoops. (For example, if flattening one hoop by 1 mm will increase its width by 1 mm, then flattening 3 hoops side-by-side by 1 mm will increase their aggregate width by 3 mm, and flattening 5 hoops side-by-side by 1 mm will increase their aggregate width by 5 mm.) Hence, from this consideration alone, the greater the number of hoops, the better. However, the greater the number of hoops, the smaller their diameter can be, and the smaller the "first runflat threshold" will be, and hence the flatter the tire will be before starting to be supported by the hoops.

The hoops 208A–208C can have a hollow cross-section of either round or elliptical, with a wide range of possible elliptical shape (ratio of major axis Amaj to minor axis Amin, ranging from very elongated to round), where a round shape is considered an "elliptical shape" in which Amaj equals Amin. The optimum elliptical shape is a compromise between two considerations: 1) the desire for the highest expansion factor (to bring the "second runflat threshold" close to the "first runflat threshold"), which would favor a high Amaj/Amin ratio, and 2) the desire for flexibility and durability, which would favor a round cross-section or at least a low Amaj/Amin ratio.

The material and wall thickness Th of the hoops 208A–208C are chosen so that the hoops are light, have low hysteresis and high fatigue resistance, and are flexible enough to be compressed enough by the distributed weight of the tire 202 to yield the required amount of lateral expansion to reach the sidewall inner surfaces 248A,248B, yet stiff enough to firmly support the carcass circumferential inner surface 246.

Both the platform radius Rp (FIG. 2B) and the cross-sectional hoop diameter Dh (or hoop major axis Rmaj if elliptical) are selected to achieve the desired clearance Cl between the hoops 208A–208C and the carcass circumferential inner surface 246, based on the desired "first runflat pressure threshold". The lower the desired "first runflat pressure threshold", the greater the clearance Cl.

Second Embodiment

While, in the preferred embodiment, the hoops 208A–208C support both the tread 210 and the sidewalls 226A,226B (by bulging laterally to contact them), it is within the scope of the invention that the hoops 208A–208C only support the tread 210 from buckling (tread-lift) without necessarily contacting the sidewall inner surfaces 248A, 248B. This is especially true for runflat tires, where the sidewalls are already stiffened by wedge inserts. Therefore, even only one hoop (which supports the tread 210 but cannot expand laterally enough to support the sidewall inner surfaces 248A,248B) is beneficial. The advantages provided by one hoop (over having no hoops) is that it prevents tread-lift for runflat and non-runflat tires; for runflat tires, it also reduces the required size and weight of wedge inserts. However, having multiple hoops is more beneficial in that it enables greater lateral expansion to support the sidewalls also.

Third Embodiment

In the first embodiment, of FIGS. 2A–2E, the platform 206 has a meridionally-flat rigid circumferential platform surface 266. However, it is within the scope of this invention for the platform surface 266 to be circumferentially-contoured and/or flexible, such is described in the following, third, embodiment.

Figure 3A:
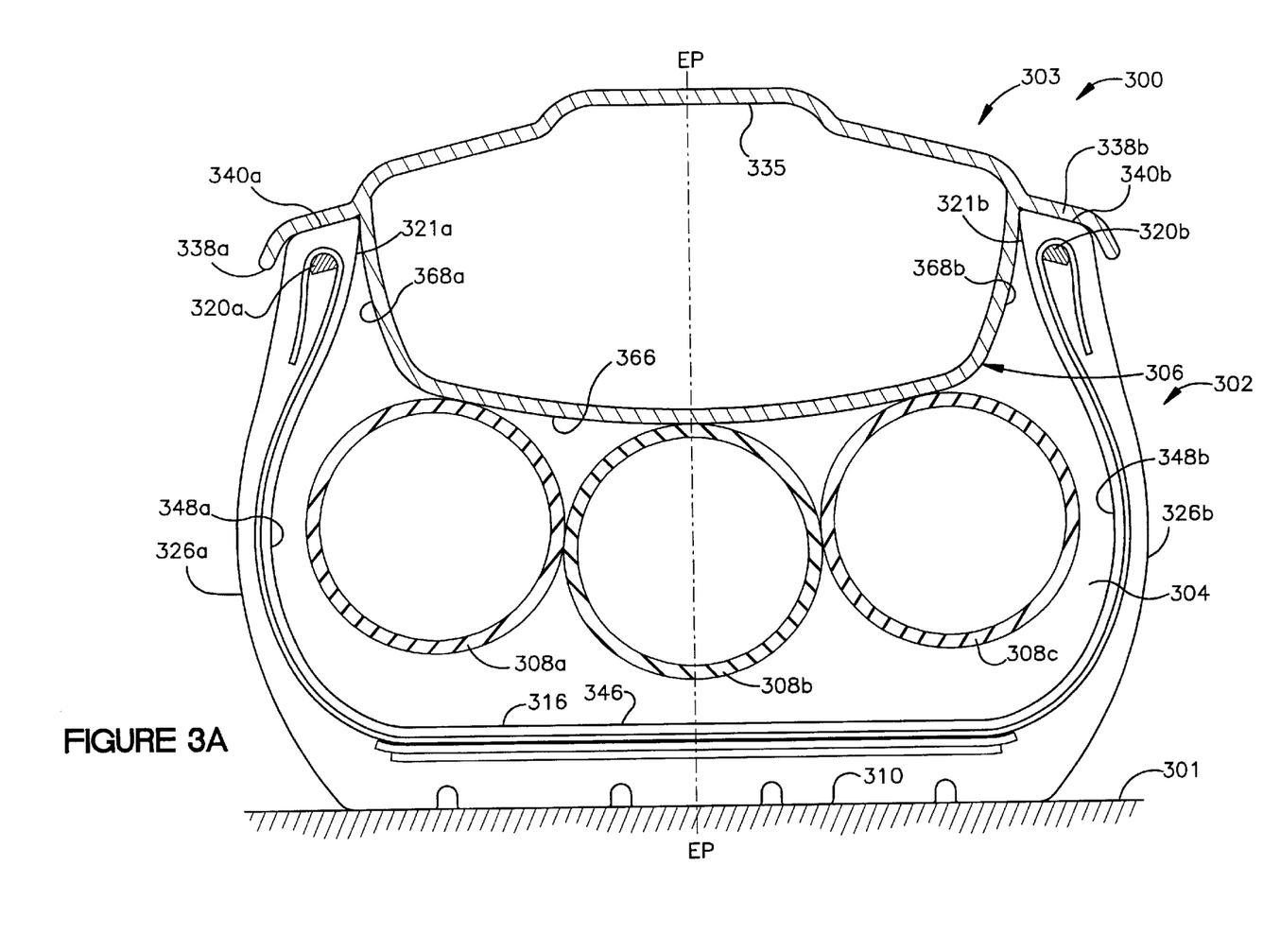
FIG. 3A shows a meridional cross-section of a tire assembly for a vehicle, according to a third embodiment of the present invention, showing its profile as it would be when proper inflated and resting on a road surface.

FIG. 3A shows a meridional cross-section of a tire assembly 300 for a vehicle, according to a third embodiment of the present invention, showing its profile as it would be when properly inflated and resting on a road surface 301. The view and components of FIG. 3A correspond with those of FIG. 2A (of the first embodiment).

The tire assembly 300 comprises a pneumatic radial ply tire 302, a rim 303 having a rim pan 335, a platform 306 disposed circumferentially around the rim, a tire cavity 304 and three deformable toroidally-shaped hollow hoops 308A–308C disposed side-by-side around the platform 306, within the tire cavity.

The tire 302 has a tread 310 and a carcass 316. The carcass 316 that has two inextensible annular beads 320A, 320B, two inner bead surfaces 321A,321B, two sidewalls 326A,326B, and two heel seats 340A,340B which form a snug air-tight seal around two rim flanges 338A,338B.

In this embodiment, the platform 306 is a solid annular insert positioned circumferentially around the rim 303, within the tire cavity 304, having two side surfaces hereinafter called "platform sides" 368A,368B and a flexible meridionally-bowed radially-outer circumferential surface hereinafter called "platform surface" 366 over which the hoops 308A–308C can slide axially. Although the platform surface 366 in this embodiment is meridionally-bowed, it is within the scope of the invention for the platform surface to have any meridional contour (shape) to achieve a desired effect. The method of securing the platform 306 to the rim 303 and the platform's and rim's choice of materials are similar to those mentioned in the first embodiment.

The tire cavity 304 is mainly bounded by a carcass circumferential inner surface 346, two sidewall inner surfaces 348A,348B, and the rim pan 335.

The hoops 308A–308C are disposed side-by-side around the platform surface 366, within the tire cavity 304. Each hoop 308A–308C is an annular hollow tube with a circular (round) or elliptical cross-section. The center hoop 308B is disposed fixedly around the platform surface 366 at the equatorial plane (EP). The two outer hoops 308A,308C are disposed slidably around the platform surface 366.

Figure 3B:
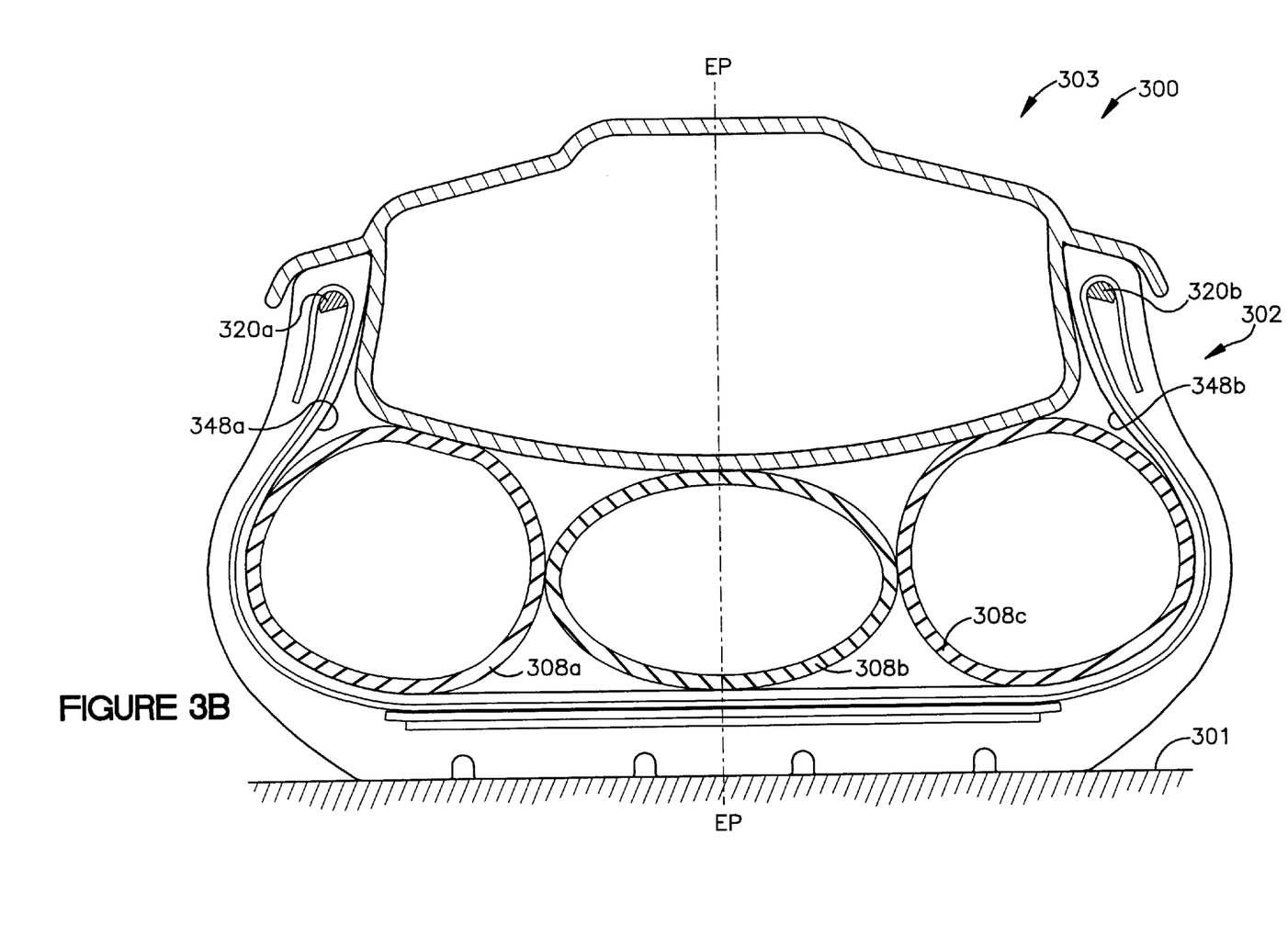
FIG. 3B shows a meridional cross-section of the tire assembly of FIG. 3A showing its profile as it would be when under-inflated and resting on a road surface.

FIG. 3B shows a meridional cross-section of the tire assembly 300 of FIG. 3A according to the present invention, showing its profile as it would be in runflat mode—that is, when deflated or under-inflated and resting on a road surface 301. In runflat mode, as tire pressure gradually drops below a certain threshold called "first runflat pressure threshold", the carcass circumferential inner surface 346 starts to rest on, and become supported by, one or more of the hoops 308A–308C, thus supporting the tread 310 to prevent tread-lift.

As tire pressure drops further, the hoops 308A–308C flatten out radially and bulge out sideways (axially), and the center hoop 308B pushes the outer hoops 308A,308C laterally outward. Additionally, the flexible platform surface 366 is pushed radially inward (thus straightening out), thus causing the platform sides 368A,368B to bend axially outward.

As tire pressure drops below another threshold called "second runflat pressure threshold", the outer hoops 308A, 308C press tightly against the sidewall inner surfaces 348A, 348B, thus stretching the sidewalls 326A,326B and keeping them from swerving laterally. Additionally, the platform sides 368A,368B press against the inner bead surfaces 321A,321B to lock the beads 320A,320B tightly in place.

The tire assembly 300 of this third embodiment offers the same benefits as those described for the tire 200 of the first embodiment. By supporting the tread 310, a non-runflat tire 302 is afforded runflat ability without increasing stiffness during normal inflated operation. For runflat tires (which already have runflat ability due to wedge inserts), runflat stiffness is enhanced (thereby reducing the required size, weight and cost of wedge inserts) without increasing stiffness during normal inflated operation For both runflat and non-runflat tires, tread-lift is reduced along with the aforementioned problems associated with tread-lift (flexural heating, fatigue, tread wear, poor handling, rolling resistance and steering resistance). Also, by supporting and keeping the sidewalls 326A,326B from buckling during runflat operation, lateral tread-sway is eliminated, thus improving stability when cornering and reducing sway. The hoops 308A–308C do not require inflation (as do some aforementioned prior art structural supports), which increases reliability and saves on maintenance and manufacturing cost. The hoops 308A–308C have a simple, light, rugged, low-cost construction relative to the prior art structural supports mentioned in the Background section.

The tire assembly 300 has the additional benefit (over the tire assembly 200) of locking the beads 320A,320B tightly against the platform sides 368A,368B during runflat operation. This reduces bead movement and the resulting chafing and tire instability. It also avoids the common problem of loss of seal between the heel seats 340A,340B and the rim flanges 338A,338B when inflation pressure is low, which normally leads to a sudden loss of any remaining air, but which is avoided by the mechanism of this third embodiment.

As previously described, FIG. 2C shows a cutaway perspective view of the rim 203. As seen in FIGS. 2A–2C, the rim 203 has a rim pan 235, a rim outer surface 237, and two rim flanges 238A,238B. The tire 202 has two heel seats 240A,240B which form a snug air-tight seal around the two rim flanges 238A,238B. The rim 203 can be comprised of metal (such as steel or aluminum) or plastic (such as reinforced plastic), or composites thereof, or different materials disposed in different sections.

The hoops 208A–208C and 308A–308C do not have to be continuous because they do not hold air and are not pressurized. Accordingly, the hoops can be split or even made of two or more independent segments. Once the segments of each of the hoops 208A–208C and 308A–308C are placed in the tire cavity, the hoop segments can be secured to each other by conventional means such as a coupling disposed within or surrounding the ends of adjacent segments. In another embodiment as discussed herein below, the segments of the hoops 208A–208C and 308A–308C are attached to the platform 206, 306, respectively, to prevent separation due to centrifugal forces.

The rim 203, 303 can be a split rim constructed of two rim sections that are joined together as is conventionally known in the art, as shown for example in U.S. Pat. No. 4,372,365 or in U.S. Pat. No. 4,424,842, both of which are incorporated in their entireties by reference herein.

Mounting Tire

An exemplary manner of mounting a tire onto a rim having a platform with one or more hoops disposed there about is described. First, one of the tire beads, for example bead 220a, of tire 202 is mounted onto a heel seat 240A of the rim. Then, the segments 206a–206d of the platform 206 are assembled about the rim. Continuing, the segments of the one or more hoops 208a–208c are placed about the platform to extend into the tire cavity. Finally, the other bead 220b is mounted on the other heel seat 240B. Then the tire can be inflated.

In an alternative mounting of a tire onto a rim with a platform with one or more hoops disposed there about is described. First, one of the tire beads, for example bead 220a, of tire 202 is mounted onto a heel seat 240A of one of the rim sections of the split rim construction. Then, the segments 206a–206d of the platform 206 are assembled about the one of the rim sections. Continuing, the segments of the one or more hoops 208a–208c are placed about the platform to extend into the tire cavity. Finally, the other rim section is mounted and secured to the first rim section so that the other bead is mounted on the other bead seat. Then the tire can be inflated.

While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

What is claimed is:

1. A tire assembly having runflat capability comprising a tire mounted to a rim to provide a tire cavity defined by a carcass circumferential inner surface, two sidewall inner surfaces and the rim; wherein the tire assembly is characterized by:

a platform disposed circumferentially around the rim, within the tire cavity; and three or more hoops disposed within the tire cavity between the platform and the carcass circumferential inner surface such that:
      under normal inflation, the three or more hoops do not contact either the carcass circumferential inner surface or the sidewall inner surfaces,
      below a first runflat inflation pressure, the three or more hoops contact and support the carcass circumferential inner surface, and
      below a second runflat inflation pressure, lower than the first runflat inflation pressure, the hoops bulge laterally and press against the sidewall inner surfaces.

2. The tire assembly of claim 1 characterized in that the three or more hoops are hollow and deformable and constructed of a material selected from the group including plastic, rubber based material and spring metal.

3. The tire assembly of claim 2 characterized in that the three or more hoops have reinforced walls that are reinforced by means including corrugated walls, cord reinforcements, and/or fiber reinforcements.

4. The tire assembly of claim 1 characterized in that the hoops have cross-sectional shapes chosen from round or elliptical, wherein the major axis (Amaj) of each elliptical hoop is aligned radially, and where the major axes (Amaj) of all elliptical hoops and the diameters (Dh) of all round hoops are equal.

5. The tire assembly of claim 4 characterized in that the cross-sectional elliptical shapes of all the elliptical hoops are all the same.

6. The tire assembly of claim 4 characterized in that the shapes of the hoops are different but symmetric around an equatorial plane (EP) of the tire assembly.

7. The tire assembly of claim 1 characterized in that one or more of the hoops are slidably affixed to the platform by each of the one or more of the hoops having means for slidably attaching the one or more hoops to the platform.

8. The tire assembly of claim 1 characterized in that the hoops are affixed together at their mutual peripheries of contact.

9. The tire assembly of claim 1, wherein the platform has a rigid meridionally-flat circumferential platform surface.

10. The tire assembly of claim 1, wherein the platform has a flexible meridionally-bowed circumferential platform surface.

11. The tire assembly of claim 4, wherein the major axes (Amaj) of all elliptical hoops and the diameters (Dh) of all round hoops have equal dimensions that are between 30% and 70% of a section height (SH) of the tire.

12. The tire assembly of claim 4, wherein the major axes (Amaj) of all elliptical hoops and the diameters (Dh) of all round hoops have equal dimensions that are between 40% and 65% of a section height (SH) of the tire.

* * * * *